Oct. 20, 1953 R. P. ARTHUR 2,656,418
CROSSBAR SYSTEM SWITCHBOARD UNIT MOUNTING
Filed July 25, 1952 7 Sheets-Sheet 3
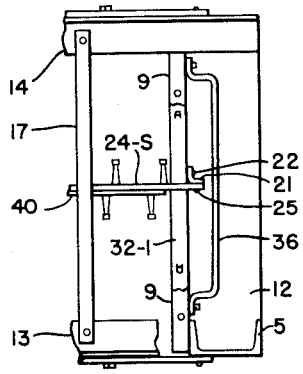
Fig. 3 Part 2
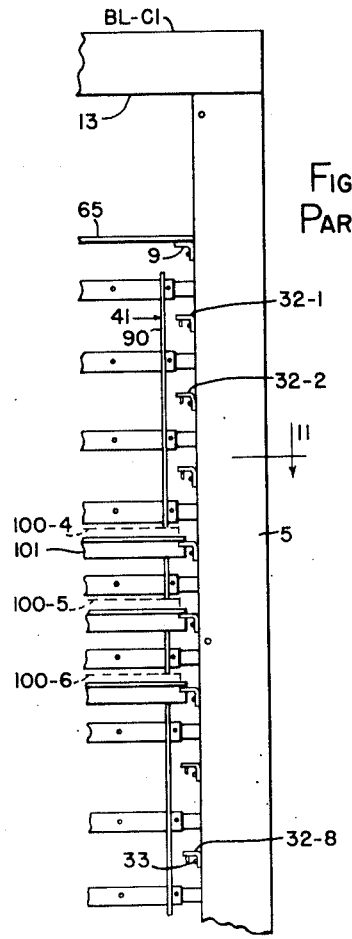
Fig. 2 Part 3
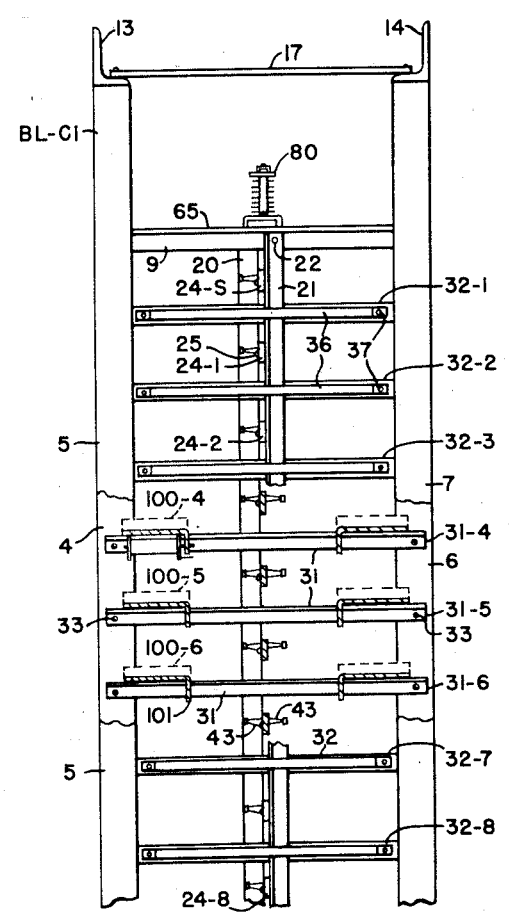
Fig. 4 Part 1
INVENTOR:
RICHARD P. ARTHUR
BY John J. Bellamy
ATTORNEY

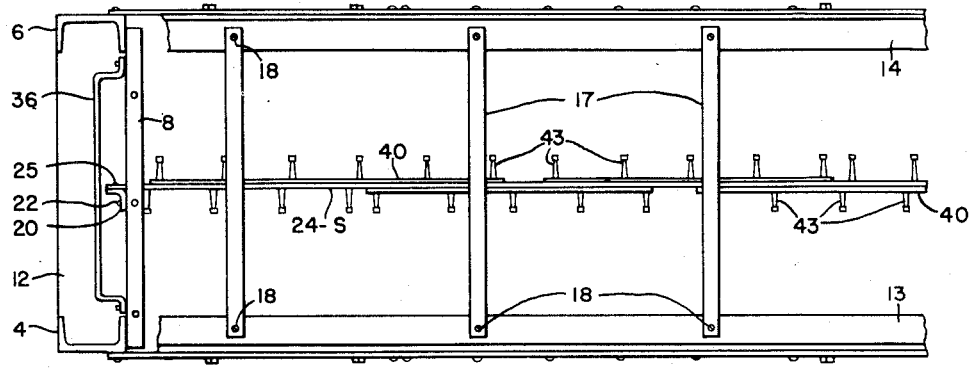
Fig. 3 Part 1
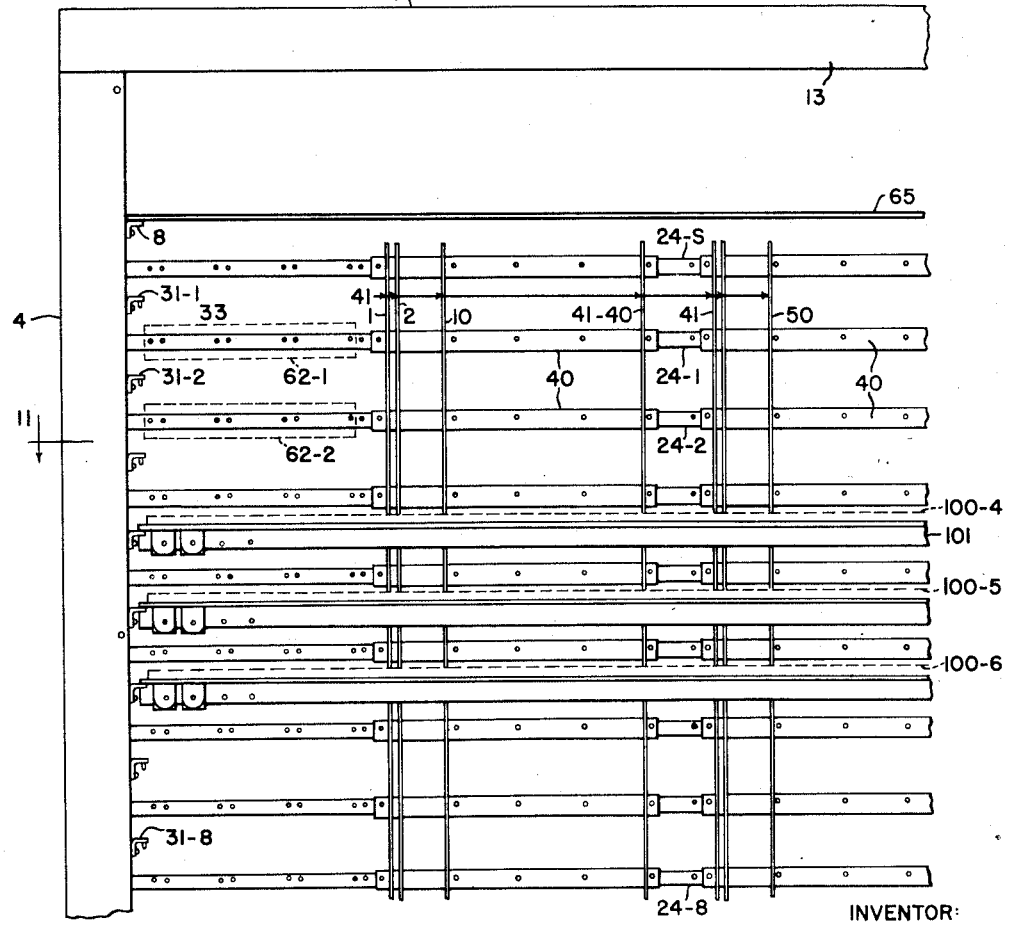
Fig. 2 Part 1

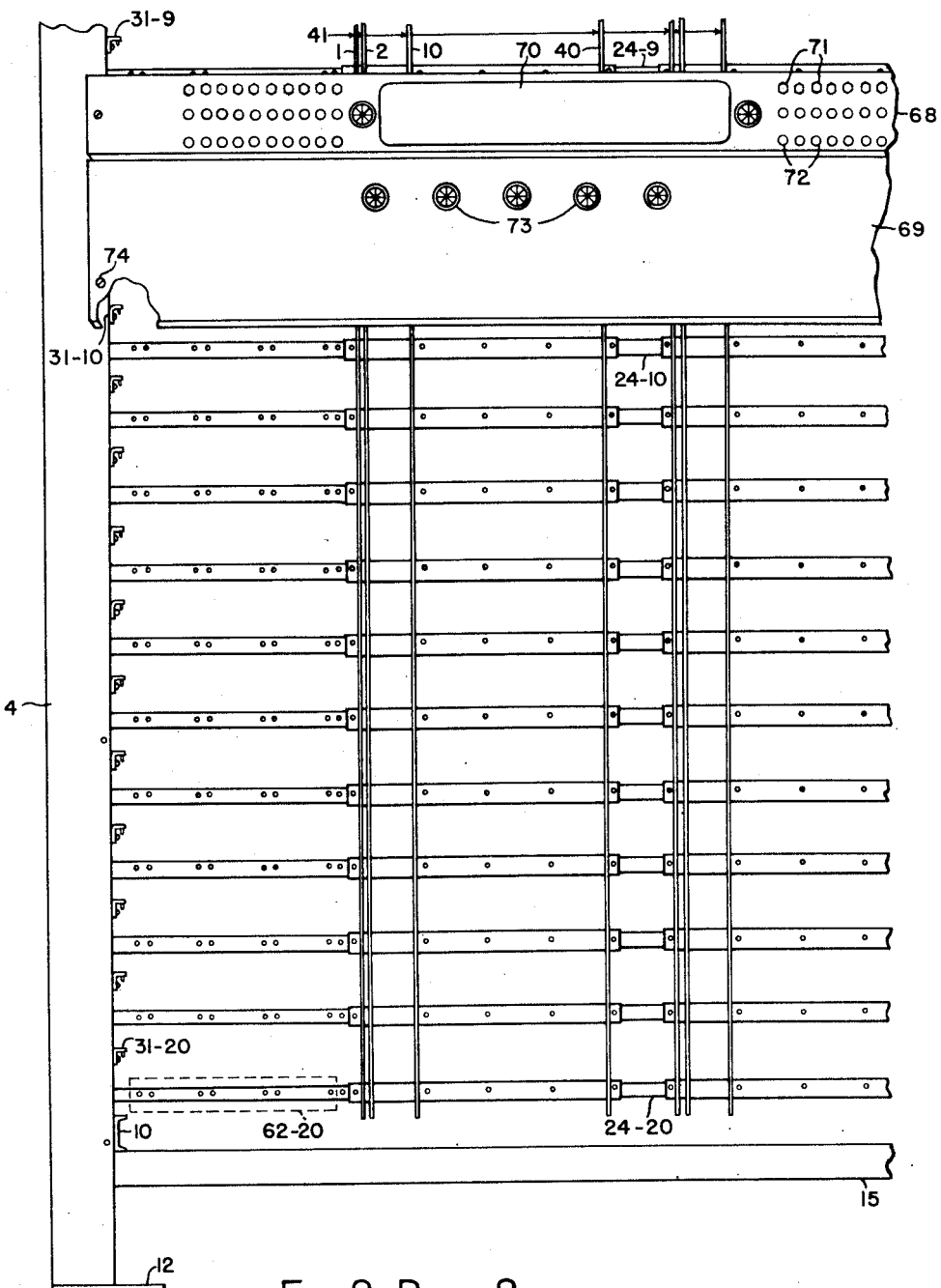
Fig. 2 Part 2

Oct. 20, 1953

R. P. ARTHUR 2,656,418

CROSSBAR SYSTEM SWITCHBOARD UNIT MOUNTING

Filed July 25, 1952

Part 4

Part 2

INVENTOR:
RICHARD P. ARTHUR
BY John J. Bellamy
ATTORNEY

Oct. 20, 1953  R. P. ARTHUR  2,656,418
CROSSBAR SYSTEM SWITCHBOARD UNIT MOUNTING
Filed July 25, 1952 7 Sheets-Sheet 6
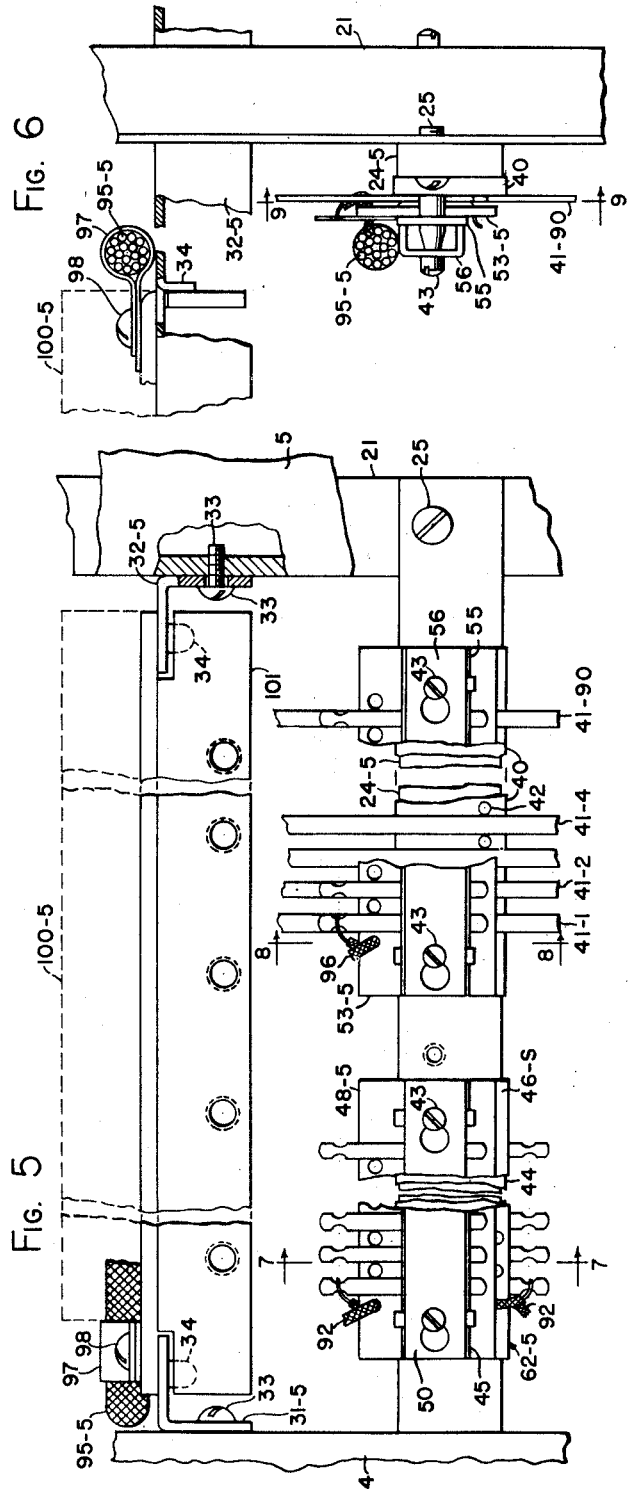
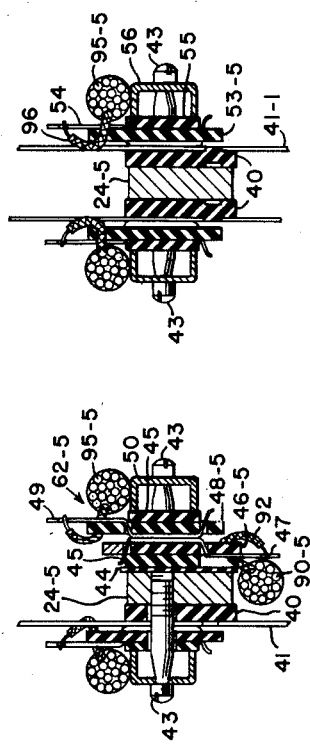
INVENTOR:
RICHARD P. ARTHUR
BY John J. Bellamy
ATTORNEY Oct. 20, 1953  R. P. ARTHUR  2,656,418
CROSSBAR SYSTEM SWITCHBOARD UNIT MOUNTING
Filed July 25, 1952  7 Sheets-Sheet 7
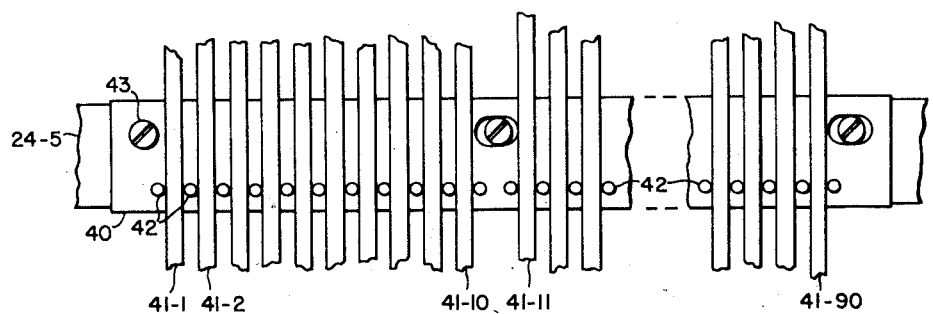
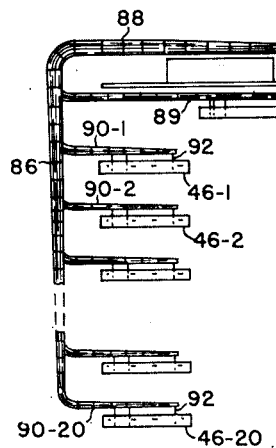
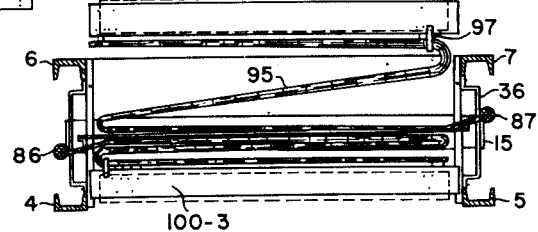
INVENTOR:
RICHARD P. ARTHUR
BY John J. Bellamy
ATTORNEY Patented Oct. 20, 1953

2,656,418

UNITED STATES PATENT OFFICE 2,656,418

CROSSBAR SYSTEM SWITCHBOARD UNIT MOUNTING

Richard P. Arthur, Chicago, Ill., assignor to Kellogg Switchboard and Supply Company, a corporation of Delaware Application July 25, 1952, Serial No. 300,939

7 Claims. (Cl. 179—91)

This invention relates to a crossbar system switchboard unit but is not necessarily limited thereto. The main object of the invention is to provide a unit having provisions for electrically interconnecting a plurality of apparatus units (termed "block coupler" or "couplers") reliably and economically.

It has been chosen to illustrate the invention as embodied in a crossbar system switchboard of the type disclosed in the application of Earle and Arthur, Serial No. 123,431, filed October 25, 1949, now Patent No. 2,627,554, being a switchboard especially adapted for use in a primary-secondary-spread crossbar telephone system as disclosed in the application of Bellamy and Bowser, Serial No. 85,292, filed April 4, 1949.

General description

In the noted crossbar-switching telephone system, each trunk incoming to the frame which is termed the block-link frame is provided with a block coupler for coupling that trunk suitably to the switchboard. Such a coupler comprises an organization of relays, digit registers, and condensers which are mounted on and along a magnetic angle bar. These bars are disposed horizontally, and one above another, to facilitate the interconnection of the couplers through vertically extending conductors.

It is also common to mount two sections of block couplers on respective sides of a frame upright, or bay, thereby halving the required number of coupler bays.

In view of the foregoing explanation, the main object may be restated as being to provide a new and improved coupler-bay construction which permits the couplers to be mounted readily thereon, and to be readily connected together in sections, and which readily accommodates the necessary auxiliary apparatus, such as fuse panels, generator lamps and the like.

A feature of the invention is that each coupler bay includes a centrally located upright structure which supports two planar sets of vertical bus bars behind the respective sections of couplers, together with facilities for supporting two sets of superposed horizontal connector strips for detachably connecting the respective couplers to the noted bus bars.

A further feature is that the block couplers are connected to their respective connecting strips by flexible cables, permitting the connected couplers to be detached and moved a limited amount for inspection and repair.

Other objects and features will appear as the description progresses.

The accompanying drawings, comprising Figs. 1 to 11, show views of the chosen preferred embodiment of the invention as follows:

Figs. 2, 3 and 4 are respectively a front view, a plan view, and a right-end view of the coupler bay BL–C1 of Fig. 1, partially equipped;

Fig. 5 is an enlarged fragmentary front view of the coupler bay of Fig. 2;

Fig. 6 is a right-hand view of the structure of Fig. 5;

Figs. 7 and 8 are sectional views taken generally along lines 7—7 and 8—8 respectively of Fig. 5;

Fig. 9 is a fragmentary sectional view taken generally along line 9—9 of Fig. 6;

Fig. 10 shows a typical frame cable; and

Figure 2:
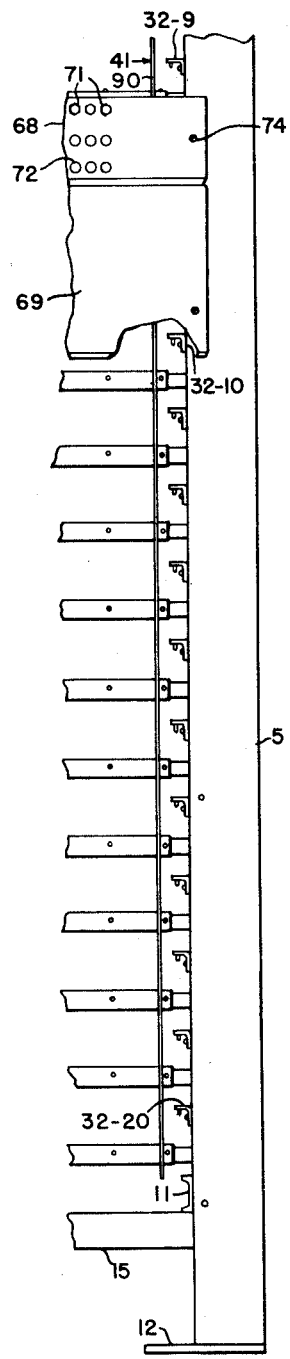

Fig. 11 is a sectional plan view taken generally along line 11—11 of Fig. 2.

General arrangement

Figure 1:
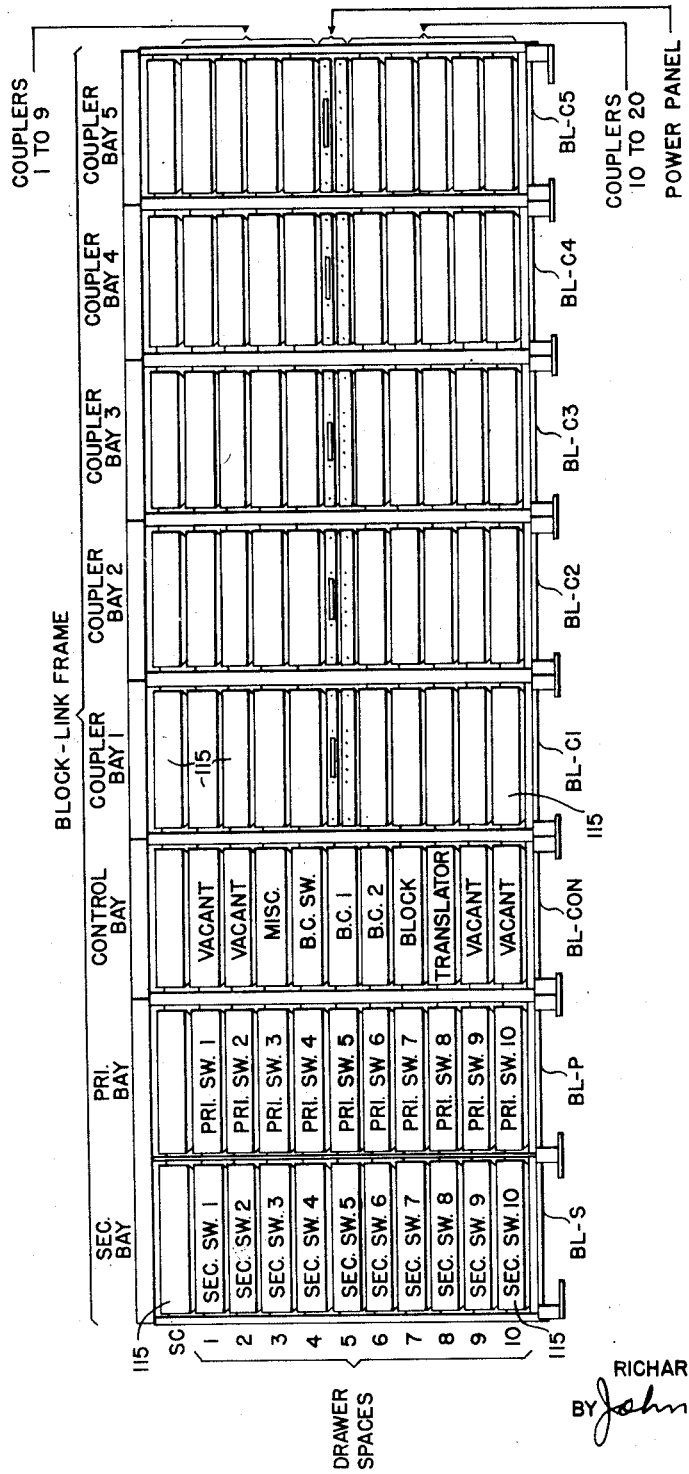
Fig. 1 is a front view of a block-link frame incorporating the invention.

Fig. 1 shows the block-link frame with the enclosures in place, concealing the switchboard apparatus. This drawing shows that the block-link frame is composed of eight bays, comprising secondary bay BL–S, primary bay BL–P, control bay BL–CON, and five coupler bays BL–C1 to BL–C5, and shows the assignment of apparatus units to locations in the respective bays, generally in accordance with the block-link frame of the cited Earle et al. application. The block-link frame of this application, however, has an added bay (BL–P). The ten primary switches are mounted together on bay BL–P, rather than being apportioned among the five coupler bays as in the Earle et al. application. One advantage of this added-bay construction is that the full height of the coupler bays can be used for coupler apparatus, giving more room between adjacent couplers and giving room for placing the fuse panel and miscellaneous apparatus (power panel) at an intermediate location, at about eye level, for example.

The secondary bay BL–S and primary bay BL–P comprise a single frame constructed similar to frame LLD, of the Earle et al. application, while each of the remaining bays is a separate frame upright, all uprights being suitably secured together incidental to installation of the apparatus.

As disclosed in the noted Earle et al. application, the enclosing members for any bay of the block-link frame may include horizontal removable panels 115, front and rear. In the first three bays, the eleven spaces respectively covered by these panels comprise a service compartment SC, followed by ten drawer spaces 1 to 10.

In secondary bay BL–S, the ten drawer spaces are occupied by secondary switches 1 to 10, as disclosed in the Earle et al. application and the ten drawer spaces of bay BL–P are similarly occupied by primary switches 1 to 10. The illustrated disposition of apparatus in the control bay BL–CON, is as disclosed in the noted Earle et al. application.

The five coupler bays BL–C1 to BL–C5 are all alike. The space opposite drawer space 5 of the first three bays is occupied in each coupler bay by a power panel, as indicated by a notation in Fig. 1. Each is a double-sided unit, having mounting provisions for two sections of block couplers, one at the front and one at the rear. Mounting spaces are provided for twenty couplers to a section. The first nine are above the power panel, while the remaining eleven couplers are below it.

In the wired and installed frame, the ten primary switches 1 to 10 of bay BL–P are associated respectively (as by cables, not shown) with the ten coupler sections occupying the five coupler bays. For example, the sections of block couplers mounted on the front of the coupler bays may be associated respectively with the odd numbered primary switches 1, 3, 5, 7, and 9, while the sections of couplers mounted on the rear of these bays may be associated respectively with the even numbered switches 2, 4, 6, 8, and 10.

Framework construction

Figure 4:
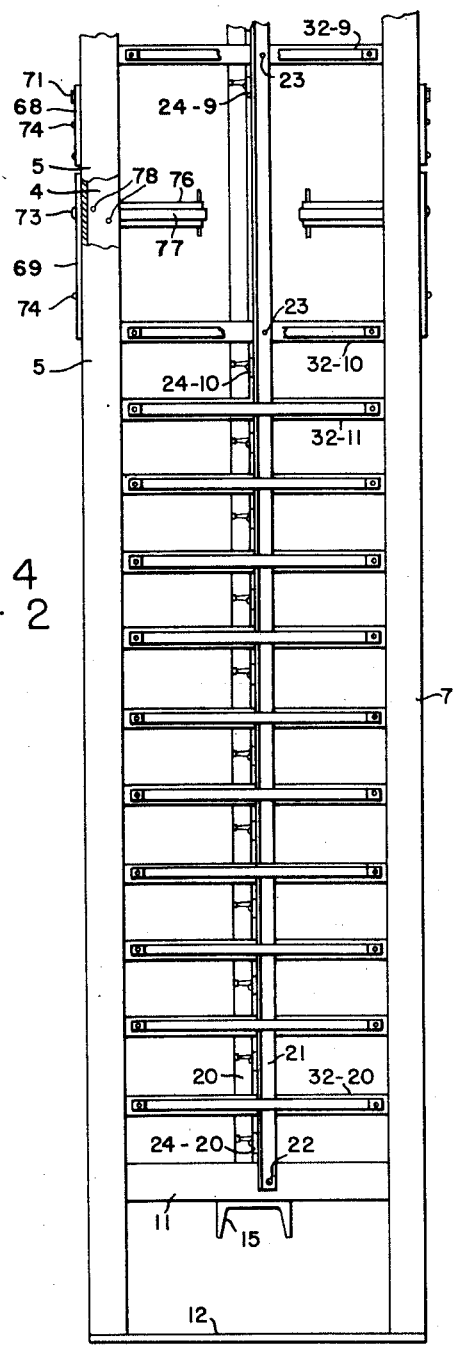

Referring particularly to Figs. 2 to 4, the framework construction of any coupler bay of Fig. 1 (for example BL–C1) will be given. The bay is there shown with enclosing members removed, together with most of the switchboard apparatus.

The framework of the illustrated coupler bay (BL–C1) includes three principal front members 4, 5, and 13, and three oppositely disposed principal rear members 6, 7, and 14. Considering the noted principal front members 4 and 5 are upright channel bars on which member 13, a horizontal angle bar, is laid and welded to the ends thereof, providing a rigid inverted U-shaped configuration. Rear members 6, 7, and 14 are similarly welded together to form a mirror image of the welded front member.

The noted front and rear U-shaped assemblies are placed in their relative locations and are welded to floor plates 12. Cable slats 17 are secured to the horizontal webs of top angle members 13 and 14 by screws 18 and angle bars 8 and 9 are welded to the vertical web of the upright channels to hold the top of the assemblies at the desired distance from each other. Parts 8, 9, 12, and 17 thus combine the front and rear assemblies into a comparatively rigid frame.

The U-shaped frame structure thus far described is longitudinally rigidified by the addition of the centrally disposed longitudinal channel member 15, which is welded to cross channels 10 and 11, welded in turn to the left-end and right-end upright channels.

For centrally supporting the detachable terminal apparatus and the two planar sets of vertically extending bus bars previously referred to, structure is provided which includes two centrally located upright angle-bar end members 20 and 21, interconnected by twenty-one horizontal rectangular bars 24–S and 24–1 to 24–20 which are secured thereto by screws 25. Members 20 and 21 are secured to the top to angle bars 8 and 9 and to channel bars 10 and 11, by screws 22, and may be further secured by screws 23 threadingly engaging the vertical web of coupler support angles 31–9, 31–10, 32–9 and 32–10 (Fig. 4).

Each horizontal bar 24–S and 24–1 to 24–20 is drilled and tapped with two slightly offset sets of holes for receiving respective sets of studs 43 (Figs. 3 and 4), for supporting front and rear terminal apparatus. Insulator strips such as 40, with holes receiving studs 43, are applied to both sides of bars 24 to insulate the terminal apparatus from the bars. The studs are applied in three groups to any bar to reduce the required length of these insulator strips. The spacing between the studs of any group is such as to accommodate ten vertical bus bars 41 or ten individual compression-connecting terminal members, hereinto identified. Each inter-stud space in a group thus provides for ten wire connections to the associated block coupler. Considering the front of bar 24–1, Fig. 2, the first group of four studs 43 supports apparatus 62–1 for three sets of ten terminals; the group supporting the first insulator strip 40 provides for four groups of ten bus bars 41–1 to 41–40 and associated terminals; and the group supporting the second insulator strip 40 provides for five groups of bus bars 41–41 to 41–90.

For uniformity, the front and rear sides of the coupler bay are identical (rather than being mirror images of each other), as may be seen best in Fig. 3.

The power panel for the front section of the bay shown in Fig. 2 is in two parts 68 and 69. They are secured to the upright channel members by screws 74 and together are of a width equal to that of a panel 115, which covers one drawer space. It is so mounted that the bus bars 41–1 to 41–90 may readily pass behind it. Portion 68 of the power panel supports a fuse panel 70, test jacks 71, and signal lamps 72, while portion 69 supports generator-lamp caps 73. Mounted directly behind the lower panel 69 is a U-shaped bracket 77, supported to the framework at each end by screws 78 (of which two are shown in Fig. 4), on which is mounted relay and generator lamp assembly 76.

Block coupler mounting

As previously pointed out, each block coupler 100 is fitted into its assigned position within the concerned switchboard frame that they may be readily moved in or out for inspection and repair. The block coupler devices (relays, counters, etc.) are mounted on and along magnetic angle bars 101 which are supported at each end on angle bars 31–1 to 31–20 and 32–1 to 32–20 (Fig. 2). The angle bars 31 and 32 are secured to the upright channel bars 4, 5, 6, and 7 by screws 33 (Figs. 2 to 5).

As viewed in Figs. 3 and 4, cable support bars 36 are provided for lacing cables thereto and are secured to the vertical web of the angle bars 31 and 32 by screws 37, as will hereinafter be described.

Figs. 5 and 6, are enlarged fragmentary views, showing a typical block coupler 100–5 and its associated detachable terminal apparatus 62–5 the bus bars and its detachable connecting apparatus. As seen best in Fig. 5, the upper-vertical web portion of angle bar 101 is notched at each end to receive the horizontal web portion of angle support bars 31–5 and 32–5.

When the block couplers are in their normal illustrated position the vertical web portion of angle bar 101 abuts shear-formed tabs 34, of angle bars 31–5 and 32–5 (Figs. 5 and 6). The couplers may be further secured by screws (not shown) at each end passing through apertures (not shown) in the vertical web of bar 101 to threadingly engage tabs 34.

Compression-terminal assembly

Each coupler 100 is provided with individual connecting means, such as compression-terminal assembly 62-5 for coupler 100-5 (Fig. 5), for electrically interconnecting wires, such as T, R, S, and HP (of the noted Bellamy et al. application), to the couplers.

The noted terminal assembly is preferably of the type of compression-connecting strip as disclosed in the Earle et al. Patent No. 2,559,715, issued July 10, 1951.

As shown in Figs. 5 and 7, the terminal assembly 62-5 is mounted on horizontal bar 24-5. A thin insulator strip 44 is first applied to bar 24-5, studs 43 being received by location holes (not shown) in strip 44. Spacing insulator strip 45 is next applied, followed by a terminal strip 46-5 (see Fig. 7) to the terminals 47 of which respective wires 92 (of the concerned branch 90-5) of cable 86 have been secured as will be described. The cable branch 90-5 is conveniently positioned and secured to the underside of horizontal support bar 24-5.

Each coupler is provided with a flexible cable (such as cable 95-5, for coupler 100-5) a portion of the wires (of cable 95-5) are connected to individual terminals 49 in terminal strip 48-5. When the terminal strip 48-5 is applied, its terminals 49 register with the associated terminals 47 of the aligned strip 46-5. Another spacing insulator 45 is next applied, followed by clamping channel bar 50 which is provided with the illustrated keyhole shaped openings. As disclosed in the second Earle et al. patent, the head of studs 43 will pass through the enlarged portion of the openings in bar 50. The clamping channel bar 50 is then moved longitudinally a controlled distance to bring the smaller portion of the keyhole shaped opening into position with the head of studs 43 to retain the bar in place. This assembly arrangement permits a final inspection for alignment etc., before the studs 43 are tightened.

Bus bar terminal assembly

As previously noted the couplers are disposed one above another and are interconnected electrically by the vertical bus bars 41-1 to 41-90. These bars may be used for connecting wires, such as ID, H, T, U, etc., of the noted Bellamy et al. application. As noted, the bus bars may be mounted as two planar sets 41-1 to 41-40 and 41-41 to 41-90, as shown in Fig. 2, including facilities for supporting two sets of superposed horizontal connector strips.

As shown in Figs. 2, 5, 7, and 9, insulator strip 40 is first applied to horizontal bar 24-5, studs 43 being received by location holes (not shown) in strip 40. The insulator is divided into two sections, the first is associated with conductors 41-1 to 41-40 and the second is associated with conductors 41-41 to 41-90. The insulator strip 40 has raised cylindrical portions 42 which are formed thereon by a semi-perforating operation, which leaves similar depressions on the underneath side thereof.

Figs. 8 and 9, respectively show the manner in which the raised cylindrical portions 42, of insulator strip 40, serves as a horizontal positioning stop for the conductors 41. Such stop positions prevent the conductors 41 from coming into contact with each other or with studs 43 besides holding members 41 in vertical alignment.

The bus bars 41-1 to 41-90 are next applied, followed by a divided terminal strip 53-5 having terminals 54 of which respective wires of flexible cable 95 have been secured. The terminal strip 53-5 is of similar construction as the noted terminal strips 46-5 and 48-5. When the terminal strip 53-5 is applied its terminals 54 register with its associated bus bar 41. A spacing insulator 55 is next applied, followed by clamping channel 56 which clamps the assembly in a manner as described for the compression-terminal assembly 62-5.

As previously noted the horizontal bars 24 have similar connecting means mounted on the rear thereof, as shown in Figs. 7 and 8.

As shown in Fig. 2, the conductors 41 have been extended above horizontal bar 24-1 to terminate at a similar bar 24-S. Bar 24-S has a similar compression connecting means, such as terminal strip 53-5, for connecting bars 41-1 to 41-90 to the terminal pin section 80 in service compartment SC through a cable branch (such as 89 of cable 86), as will be described.

The portions of the bus bars 41 extending below the horizontal bar 24-20 may have their ends formed as terminals, thereby permitting "jumper wires" to be attached between the front and rear section of bus bars.

Frame wiring

Each frame of the block-link frame contains frame wiring suitably connecting the apparatus located within the frame to the terminal-pin section located within the noted service compartment SC. In describing the frame wiring, coupler bay BL-C1 of Figs. 2, 3 and 4 has been selected as typical, and the frame wiring required is contained in cables 86 and 87, Figs. 10 and 11. The frame cable 86, Fig. 10, serving the front section of couplers, is shown detached from the switchboard for clarity of illustration. Cable 86 extends from terminal-pin section 80 in the service compartment of the coupler bay BL-C1 to the couplers mounted within the frame. The desired one of the terminals in the terminal-pin section 80 are interconnected with terminals on one or another of the switchboard bays, by cables installed (not shown) in the cable runway as disclosed in the Earle et al. application.

When cable 86 is installed, the vertically disposed portion thereof lies in the space between the upright left-end members 4 and 6 of frame BL-C1, as shown in section in Fig. 11, and is secured by lacing the vertical portion of cable to the support bars 36. The main horizontal portion 88 of cable 86 lies within the service compartment SC of the frame, where the individual wires are connected to respective terminal pins of terminal-pin section 80. A separate horizontal branch 89 is provided for connecting the terminal strips associated with bar 24-S to their associated terminals of terminal-pin section 80. Horizontal branches 90-1 to 90-20 are provided for connecting the terminal strips 46-1 to 46-20 for couplers 100-1 to 100-20 to the terminal-pin section 80.

Cable 87, serving the rear section of couplers, is installed with its vertically disposed portion lying in the space between the upright right-end members 5 and 7, as shown in section in Fig. 11, and is connected and secured in the same manner as for cable 86 serving the front section of couplers.

In the space between the upright end members having the vertically disposed portions of cables 86 and 87 (as shown in Fig. 11), still further cables (not shown) may be located.

Terminal cables

Connections from the couplers 100-1 to 100-20 to compression terminal assembly 62-1 to 62-20 and the bus bars 41 are made through a flexible cable, such as cable 95 as shown in Fig. 11. Cable 95 is of a typical "goose-neck" configuration thereby permitting the individual couplers to be pulled outwardly, as shown in Fig. 11 for the rear coupler while the front coupler is shown in its normal position.

As shown in Figs. 5 and 6, one connecting branch of the cable 95, is secured to the magnetic angle bar 101 by cable clamp 97, which is secured thereto by screw 98. The other connecting branch of cable 95 may be secured to the associated horizontal angle bar 24 as by lacing. This method of securing cable 95 relieves the strain from the individual wires when the couplers are pulled out from the frame for inspection or repair.

I claim:

1. In combination, a switchboard frame defining a generally rectangular upright mounting space, a terminal frame and means for supporting it within the switchboard frame to divide said space into similar front and rear portions accessible respectively from the front and rear faces of the switchboard frame, means on said switchboard frame for supporting two similar sections of apparatus units respectively within the said front and rear portions, the apparatus units of either section each extending across said space and being disposed one above another in a column, each said apparatus unit having local terminal apparatus connected thereto comprising a strip of local terminal members for contact with respective frame terminal members, a front set and a rear set of frame terminal members and means for supporting them on respective sides of the terminal frame in position to be contacted by the local terminal members when the respective strip means for the rows of local terminal members are disposed horizontally one above another, and means for supporting any said strip of local terminal members in a horizontal position adjacent to its apparatus unit and with its terminal members in contact with respective frame terminal members.

2. The combination of claim 1 in which said terminal frame includes superposed horizontal support bars each having a front face and a rear face, means for supporting said bars in respective physical association with the apparatus units of either section, separate support means associated with each said face of each bar, the last said support means and said faces being included in the said means for supporting the frame terminal members and the strips of local terminal members.

3. The combination of claim 1 in which each said set of frame terminal members comprises a group of individual terminal members divided among and appearing individually at the several apparatus-unit levels, and comprises a laterally displaced group of common terminal members in the form of vertical bus bars extending among the several apparatus-unit levels, the group of individual terminal members in the front set being between the common terminal members of the front set and one end of the frame, the individual terminal members of the rear set being between the common terminal members of the rear set and the other end of the frame, whereby the left-right disposition of the terminal members of either set is the same as that of the other set when each is viewed from its associated side of the frame.

4. The combination of claim 1 in which the said means for supporting the said two sets of frame terminal members supports the front set nearer to one end of the frame than to the other end, and supports the rear set nearer to the said other end of the frame than to the said one end, whereby the left-right disposition of the frame terminal members is the same when facing the rear side of the frame as it is when facing the front side of the frame.

5. A dual-sided terminal-support frame including side supports and a series of similar bars extending between the side supports, means securing the bars to the side supports, each bar having first and second series of holes extending therethrough and disposed therealong, the two series of holes being longitudinally displaced from each other, a first series of terminal-support members each supported at one end in a separate hole of the first series of the bars and extending outwardly from one side of the bars and of the frame, a second series of terminal-support members each supported at one end in a separate hole of the second series of the bars and extending outwardly from the other side of the bars and of the frame, and two laterally displaced groups of terminals supported on opposite sides of the bars and of the frame by the respective series of terminal-support members.

6. A generally rectangular upright switchboard structure comprising two pairs of upright end members defining respective end faces of the structure, with the front and rear members defining the front and rear faces respectively, first horizontal members paralleling the front and rear faces and structurally joining the two pairs of end members, two sets of second horizontal members paralleling the end faces and joining the end members of the respective said pairs, each such set including an upper member and a lower member extending across the inside face of each end member of its pair, two intermediate upright members at the respective ends of the structure, each intermediate member lying between the end members of the associated end of the structure and in contact with the outside face of each of the associated second horizontal members, and a series of superposed intermediate horizontal members each extending across, and in contact with, a face of each intermediate upright member.

7. The structure of claim 6 in combination with two groups of terminal members and means for supporting them respectively on the front and rear faces of the said intermediate horizontal members, two groups of apparatus units and means for supporting them within the structure respectively on the front side of and on the rear side of the intermediate horizontal members in association with the respective groups of terminal members, and conductor groups connecting the groups of apparatus units to the respective groups of terminal members.

RICHARD P. ARTHUR.

No references cited.